United States Patent [19]

DeBiasi et al.

[11] Patent Number: 4,922,874
[45] Date of Patent: May 8, 1990

[54] AUTOMOBILE ELECTRONIC CONTROL MODULES COMMUNICATING BY PULSE WIDTH MODULATED SIGNALS

[75] Inventors: Charles J. DeBiasi, Allen Park; Wesley D. Boyer, Dearborn, both of Mich.

[73] Assignee: Ford Motor Company, Dearborn, Mich.

[21] Appl. No.: 374,036

[22] Filed: Jun. 30, 1989

[51] Int. Cl.$^5$ ............................................. F02P 5/15
[52] U.S. Cl. ............................. 123/417; 364/431.04; 364/431.12
[58] Field of Search ................ 123/416, 417, 609, 643; 364/431.01, 431.03, 431.04, 431.12

[56] References Cited

U.S. PATENT DOCUMENTS

| | | | |
|---|---|---|---|
| 3,969,614 | 7/1976 | Moyer et al. | 364/431.06 |
| 4,231,091 | 10/1980 | Motz | 364/431.04 |
| 4,236,213 | 11/1980 | Richardson | 364/431.04 |
| 4,321,580 | 3/1982 | Deleris | 340/870.24 |
| 4,351,306 | 9/1982 | Luckman et al. | 123/609 |
| 4,367,710 | 1/1983 | Deleris | 123/416 |
| 4,384,331 | 5/1983 | Fukuhara et al. | 364/431.12 |
| 4,429,365 | 1/1984 | Luckman et al. | 364/431.08 |
| 4,459,968 | 7/1984 | Brandt et al. | 123/643 |
| 4,472,776 | 9/1984 | Deleris et al. | 364/431.12 |
| 4,489,689 | 12/1984 | Avian et al. | 123/417 |
| 4,562,812 | 1/1986 | Chauvel | 123/417 |
| 4,644,284 | 2/1987 | Friedline et al. | 364/431.12 X |
| 4,661,778 | 4/1987 | Anderson | 324/380 |
| 4,730,256 | 3/1988 | Niimi et al. | 364/431.12 |
| 4,736,323 | 4/1988 | Utsumi et al. | 364/431.12 |
| 4,762,105 | 8/1988 | Beyer et al. | 123/417 |
| 4,787,354 | 11/1988 | Wilens et al. | 123/417 X |
| 4,809,660 | 3/1989 | Marsh et al. | 123/417 |
| 4,855,919 | 8/1989 | Bergholz | 123/417 X |
| 4,884,204 | 11/1989 | Seibt et al. | 364/431.03 |

OTHER PUBLICATIONS

"A Distributorless Engine Management System", 6th International Conference on Automotive Electronics, IEE Pub. No. 200, Oct. 1987, pp. 64-69.

*Primary Examiner*—Willis R. Wolfe
*Attorney, Agent, or Firm*—Mark L. Mollon; Paul K. Godwin

[57] ABSTRACT

A distributed processing system in an automotive environment achieves enhanced noise immunity and reduces the processing burden and background loop time of the master controller by providing for communication of signals between a master controller and a slave controller by pulse width modulated communication signals. In a preferred embodiment, the communicated signal is a spark advance which is transmitted to an ignition module for implementing spark events in an internal combustion engine. The spark advance pulse width is a linearly decreasing function of spark advance value since increased spark advance is associated with an increase in engine speed. The spark advance is encoded into a pulse width signal according to a method which simplifies decoding of the spark advance information in the ignition module.

5 Claims, 3 Drawing Sheets

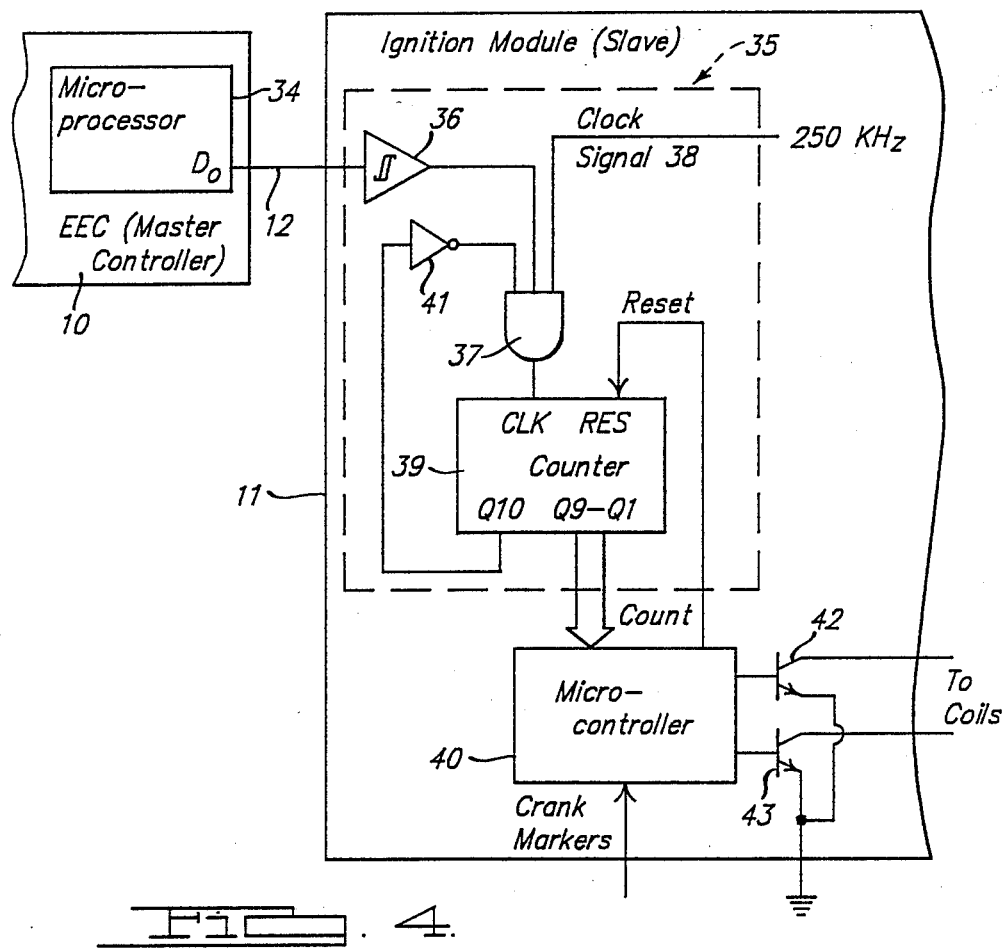

AUTOMOBILE ELECTRONIC CONTROL MODULES COMMUNICATING BY PULSE WIDTH MODULATED SIGNALS

BACKGROUND OF THE INVENTION

The present invention relates in general to electronic controls in an automobile, and more specifically to the transmitting of spark timing target values from an engine controller to an ignition module using pulse width modulation.

Distributed processing is a commonly used technique in computer based systems wherein information processing devices are interconnected so that data can be exchanged and the processing functions are shared. Such distributed systems are employed to achieve increased capacity, increased speed, and improved flexibility for making modifications.

Distributed processing systems have been used to advantage in automobile control systems, especially electronic engine controls. For example, a main controller monitors engine conditions from a plurality of sensors. Based on engine conditions, the main controller calculates various settings for setting a plurality of engine control parameters. A separate engine control parameter may be controlled by a separate programmable control module which receives signals from the main controller and performs its own calculations prior to implementing a control function over the engine parameter. By way of example, separate control modules, responsive to a main controller, can supervise operation of fuel injectors, spark timing, exhaust gas recirculation (EGR), and other automotive systems. Furthermore, systems other than the engine can be controlled using distributed processing systems, such as the transmission system or the suspension system in a vehicle.

In order to successfully operate a distributed processing system, data must be accurately communicated between the separate processors. However, an automobile engine is a noisy electrical environment, especially due to electromagnetic interference generated by spark events in the cylinders. If noise signals are picked up by the communication line connected between processors, corruption of transmitted data can result. The corruption of data is likely to cause improper operation of the controlled system (e.g., engine).

Moyer et al, U.S. Pat. No. 3,969,614, discloses an electronic engine control which monitors engine parameters and in response commands settings of fuel injection, exhaust gas return valve, and spark advance. A main central processing unit determines a proper spark advance value for the current condition of the engine. Commanded values are communicated to implementing circuits via a digital bus. U.S. Pat. No. 4,231,091 issued to Motz, and U.S. Pat. No. 4,351,306 issued to Luckman et al, provide additional examples of the use of a digital bus to communicate ignition signals from a master unit to an ignition unit, but the units are tied together by an address bus and a data bus within a single module.

Noise on a digital data line can cause random errors in the digital value transmitted. Thus, the resulting error in the communicated data can occur in either high order or low order bits. Therefore, the error introduced by a single noise pulse can be very large.

U.S. Pat. No. 4,661,778 issued to Anderson includes a further communication technique wherein the master control provides a pulse to an ignition module for directly commanding spark and ignition timing in real time. In this case, the pulse has a first transition at a time corresponding to the beginning of a dwell period wherein an ignition coil is supplied with current. A second, reverse transition in the pulse occurs at the time when a spark is desired and when current to the ignition coil is turned off. Noise signals occurring during the period of the ignition timing pulse can cause the spark event to occur at a random time, rather than at a desired spark advance.

SUMMARY OF THE INVENTION

Accordingly, it is a principal object of the present invention to provide method and apparatus for communicating data between a master engine controller and a slave controller, wherein the effects of noise on the communicated data are minimized.

It is another object of the invention to provide a method and apparatus for communicating data between coprocessors which requires a minimum of processor time to supervise the data transfer.

It is a further object to improve engine performance and responsiveness to changing conditions.

It is still another object to provide a data communication scheme for spark advance information from a master engine controller to an ignition module using data encoding which simplifies calculation of the time at which a spark event is to occur.

These and other objects are achieved by the present invention which employs a pulse width modulated signal for communicating between processors. The master controller supervises operation of an automotive system. A slave controller implements control of a portion of the automotive system in accordance with information exchanged with the master controller. A signal communication line is coupled between the master controller and the slave controller for communicating signals therebetween. One of the controllers includes means for generating a signal on the signal communication line during a predetermined communication time period, the signal being generated as a pulse having a duration representative of the exchanged information. The other controller includes means for accumulating the pulse during the predetermined communication time period and for fixing a value for the exchanged information upon termination of the predetermined communication time period.

The invention further includes a method for communicating information between electronic engine control modules in which the rotational position of the engine is monitored. The occurrence of a communication period is detected with the engine position being within a first predetermined range of positions. A pulse width modulated pulse is transmitted from a first module to a second module during the communication period. The pulse is integrated in an accumulator in the second module during the communication period. Occurrence of a read portion is detected with the engine position being within a second predetermined range of positions. The integrated pulse is read from the accumulator during the read period. The accumulator is cleared prior to a succeeding communication period.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 4 is a part schematic, part block diagram of apparatus according to the present invention.

FIGS. 6a–c are diagrams showing bit values according to a preferred embodiment for decoding communicated spark information in the ignition module.

DETAILED DESCRIPTION OF THE PREFERRED EMBODIMENT

Figure 1:
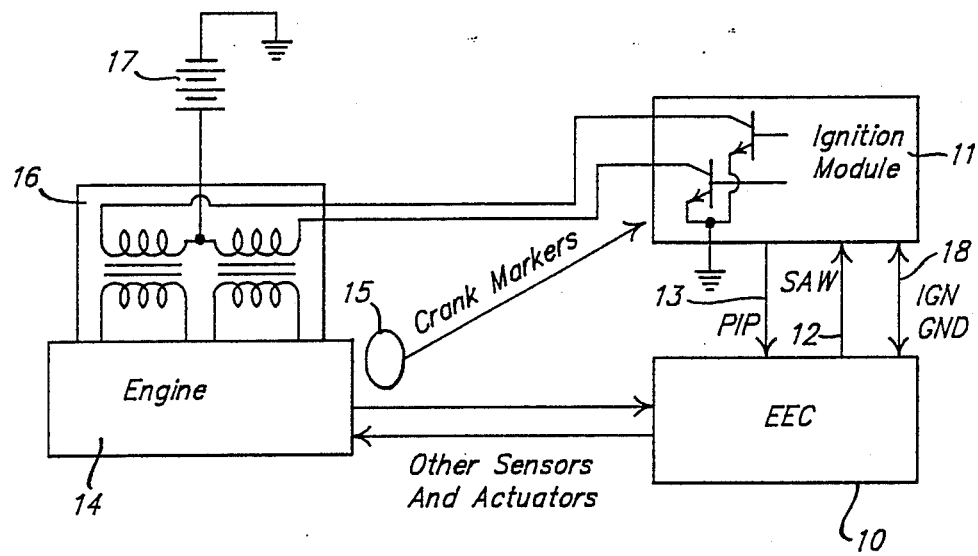
FIG. 1 is a block diagram showing an electronic engine control and ignition module coupled to an engine as may be employed in the present invention.

Referring to FIG. 1, an electronic engine control (EEC) 10 is a master controller for an engine 14 and is connected to an ignition module 11. EEC 10 provides a spark advance word (SAW) on a communication line 12 for indicating the engine crankshaft angle at which spark should occur. Module 11 provides a profile ignition pulse (PIP) on a line 13 for indicating rough position of the engine crankshaft in order to allow EEC 10 to determine such engine parameters as engine speed in rpm and engine acceleration. The PIP signal occurs at 10° before top dead center (BTDC) for each cylinder to additionally provide a default spark timing. An ignition ground line (IGN GND) 18 is connected between EEC 10 and module 11 to provide a reference level for communicating PIP and SAW signals.

A crankshaft position sensor 15 is located in close proximity to the crankshaft of engine 14 and provides a sensor output to module 11. Coils 16 are coupled to the spark plugs of engine 14, to a battery 17, and to module 11. Coils 16 are energized under control of module 11, both as to duration of current flow through coils 16 (i.e., dwell) and the time of termination of current flow (i.e., spark timing). EEC 10 is coupled to other sensors and actuators for controlling other aspects of the operation of engine 14 such as fuel injector pulses, exhaust gas recirculation, and air/fuel mixture.

In its role as the master engine controller, EEC 10 processes many active environmental sensor signals to determine a desired spark advance value. Variables, such as manifold absolute pressure, engine speed, engine coolant temperature, and engine knock, are monitored and their values are used by a computerized engine control strategy employing various calculations and multi-dimensional data tables in order to determine the proper spark advance.

The commanded values for spark advance, fuel pulse width, exhaust gas recirculation, and other controlled parameters are normally calculated by EEC 10 in a background loop. The time between updating of engine parameters is dependent upon a background loop time required to execute all control calculations. A shorter background loop time results in more frequent updates and improved engine performance. At high engine speed, the background loop time increases due to the need for a faster real time response required for critical output functions to implement the spark timing and fuel ejection timing.

Due to the need for reduced background loop times, distributed processing is employed, whereby module 11 performs the timing functions for implementing a spark advance. For the same reason, a high data rate sensor 15 is coupled to module 11 for processing the high data rate signals. A lower data rate PIP signal is provided from module 11 to EEC 10 thereby reducing the load on EEC 10.

In response to the spark advance word (SAW) received over line 12, ignition module 11 determines a time, referenced to crankshaft position, for initiating coil current flow and initiation of a spark by switching the coil current provided from battery 17 through the coils and to ground.

Figure 2:
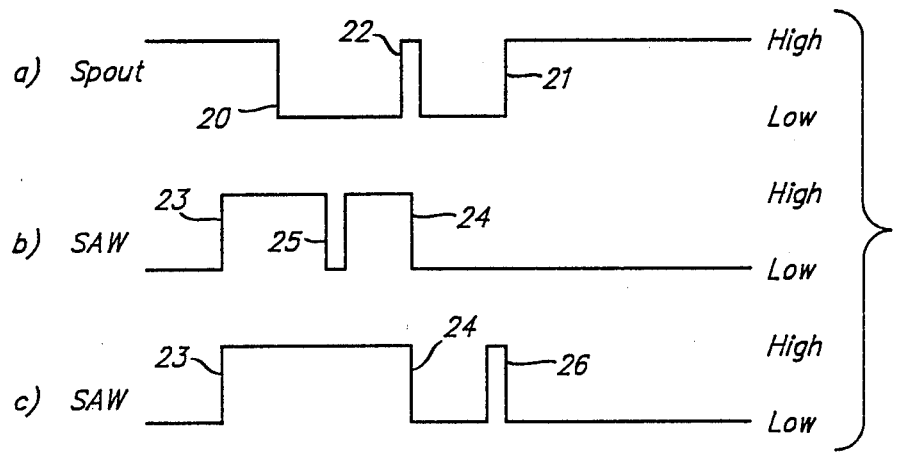
FIGS. 2a–c provides waveform diagrams for illustrating the effects of noise on a spark command signal.

It is known from the prior art to perform ignition timing functions within EEC 10 such that an output signal on line 12 directly controls the spark timing. This signal has been called SPOUT for spark output. As shown in FIG. 2a, a SPOUT signal can indicate a beginning of a dwell period by a negative transition of a pulse shown at 20. A rising transition occurs at 21 to indicate the beginning of a spark event. However, a noise signal 22 may occur during the dwell period which introduces a rising transition and causes an early spark event. If noise signals are random, the possibility exists that the spark error will be great in response to a single noise pulse.

In prior art distributed processing systems, the desired angle of spark advance has been transmitted from a master controller to a slave ignition module in digital format, over either a parallel or a serial bus. A single noise pulse occurring during transmission of a digital word has the possibility of greatly affecting the spark angle since either high order bit or a low order bit can be effected. Thus, a single noise pulse in prior art systems can dramatically advance the occurrence of a spark event. Other problems are also noted, including reduced energy output in a spark and multiple misfires.

According to the present invention, the possible effects of noise on a transmitted spark advance value are reduced by transmitting the spark advance word using pulse width modulation. This SAW pulse is provided by master EEC 10 over line 12 to ignition module 11. The pulse is accumulated by module 11 during a predetermined communication time, after which the accumulated pulse value is fixed and read out from an accumulator. As shown in FIG. 2b, a SAW pulse can include a rising edge 23 and a falling edge 24, wherein the length of the SAW pulse is algebraically related to the amount of spark advance. A noise pulse 25 occurring during the SAW pulse causes a loss of the SAW pulse for a brief interval thereby causing a reduced amount of pulse width to be accumulated. Likewise, in FIG. 2c, a noise pulse 26 occurring outside of the SAW pulse introduces a small error into the final spark advance value corresponding to an increased SAW pulse virtue. However, in each case the total error introduced in the accumulated SAW value is small.

Synchronization between EEC 10 and the ignition module 11 is achieved by establishing communication periods and read periods according to engine position within the engine cycle to ensure that transmission of a SAW pulse does not occur simultaneously with the reading out of a pulse from the accumulator within module 11. In fact, a communication period in which a SAW pulse is transmitted can occur substantially at any time during a cylinder event other than when a previous spark advance word is being read or the accumulator is being cleared. Preferably, a read period is established as a fixed time segment of approximately 10 microseconds at or near 10° after top dead center (ATDC). A read period at 10° ATDC is preferred since most spark activity is absent during that period which might otherwise cause interference.

Thus, spark advance is calculated in EEC 10, the SAW pulse is communicated to ignition module 11 via pulse width modulation, and ignition module 10 executes the spark timing and controls ignition dwell. Background loop time of EEC 10 is reduced since the SAW pulse width and the determination of the occurrence of a communication period are computed through simple algebraic methods. Since the real time requirement of spark timing and dwell are handled by ignition module 11, background loop time for EEC 10 is shortened and overall engine performance is improved.

Figure 3:
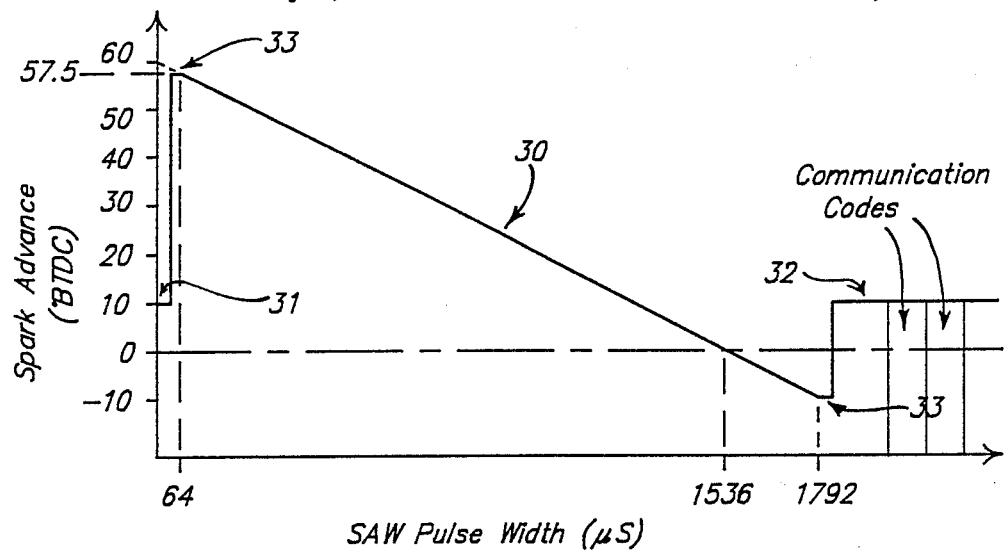
FIG. 3 is a transfer function according to a preferred embodiment of the present invention.

A preferred transfer function for relating pulse width to spark advance angle is shown in FIG. 3. As engine speed increases, the time available for transmitting a SAW pulse decreases. Furthermore, a advance in spark angle is associated with increased engine speed. Thus, a transfer function is shown in FIG. 3 such that as SAW pulse width decreases, spark advance before top dead center increases. Thus, a valid SAW pulse width region 30 shows the valid operating region of spark advance while regions 31 and 32 of the SAW transfer function relate a SAW pulse width outside the valid region to a default spark advance value of 10° BTDC. Valid SAW pulse region 30 includes a pair of guard bands 33 to protect against erroneous reading of a pulse as being outside the valid range.

The preferred embodiment of the SAW pulse width transfer function provides a spark target range of from 57.5° BTDC to 10° ATDC (i.e., minus 10° BTDC). The specific range from 64 microseconds to 1792 microseconds associated with the valid range of SAW pulse width results in a SAW pulse width value which is an integer exponent of 2 of the ignition module clock ticks. This simplifies conversion of SAW pulse width to spark time (i.e., location of the crankshaft), as will be discussed below.

Referring now to FIG. 4, apparatus for transmitting and receiving a SAW pulse is shown in greater detail. Master controller or EEC 10 includes a microprocessor 34. An output data line $D_0$ is connected to communication line 12 which is connected at its other end to a pulse accumulator 35 in slave/ignition module 11. Line 12 is connected to the input of a threshold detector with hysteresis 36, such as a Schmitt trigger. The output of detector 36 is connected to an input of a 3 input AND gate 37. A clock signal 38 is coupled to another input of AND gate 37. The output of AND gate 37 is connected to a clock input of a counter 39. Counter outputs Q1 to Q9 are coupled to a microprocessor 40. The next highest order output bit of counter 39, such as Q10, is connected as an overflow signal to an inverter 41 which has its output connected to the remaining input of AND gate 37. Microprocessor 40 has an output connected to a reset input of counter 39. Further outputs of microprocessor 40 are connected to the driving inputs of a pair of transistors 42 and 43 for driving the ignition coils. In an alternative embodiment, the elements of accumulator 35 could all be implemented within a microcontroller 40.

In operation, microprocessor 34 in EEC 10 calculates a desired spark angle and the corresponding SAW pulse width for transmission on line 12. Microprocessor 34 provides an output signal at its output $D_0$ for the time corresponding to the SAW pulse width. The signal on communication line 12 is detected by detector 36 which provides a high output signal during the SAW pulse to enable AND gate 37 for the transmission of clock signal 38. Thus, counter 39 counts the pulses of gated clock signal 38 during a SAW pulse such that the output of counter 39 is a digital accumulation of the SAW pulse. If a SAW pulse is accumulated greater than the valid pulse width, an overflow signal from Q10 causes the output of inverter 41 to go low, thus preventing further clock signals from passing through AND gate 37.

When microprocessor 40 detects a crankshaft position corresponding to the time for reading the accumulated pulse width (e.g., 10° ATDC), it reads the count output from counter 39 and sends a reset pulse to the reset input of counter 39 to prepare for accumulating the next SAW pulse. The next communication time period begins when the reset signal is removed from the reset input of counter 39. Microprocessor 40 next reconverts the SAW pulse width to a spark advance angle according to the method described below. Based on the reconverted spark advance angle and a dwell determined by microprocessor 40, a pair of transistors 42 and 43 are energized to provide the appropriate coil current to coils 16 (FIG. 1).

In order to simplify conversion of the SAW pulse width into a spark advance angle and to minimize spark conversion error, the SAW transfer function is related to the pulse accumulator clock period by a factor of two to an integer power, and to the engine crank marker interval supplied to the ignition module. By including the pulse accumulator clock period and an exponent of two in the equation for finding SAW pulse width from spark angle, the ignition module can rapidly convert the SAW pulse width back to a spark angle while reducing round off errors. The use of the crank marker interval (measured in crankshaft rotation degrees per position locating signal) in the equation for finding SAW pulse width provides a reliable means for comparing a commanded spark advance with sensed position signals when implementing a spark interval. This method reduces computing time and increases dynamic spark accuracy within the ignition module. The formula for calculating SAW pulse width from a desired spark advance angle is as follows:

$$SAW = ZTDC - (ST * T * 2^x / CMI)$$

where
SAW is the calculated pulse width (in microseconds);
ZTDC is the pulse width offset corresponding to the SAW pulse width for a spark advance of 0° TDC;
ST is spark advance in degrees, and is negative for spark angles after top dead center (ATDC);
T is the pulse accumulator clock period (in microseconds);
$2^x$ is the number of steps between position signals for a desired spark resolution and x is a whole number; and
CMI is the engine crank marker interval, i.e., the number of degrees of crankshaft rotation between signals from the position sensor.

Figure 5:
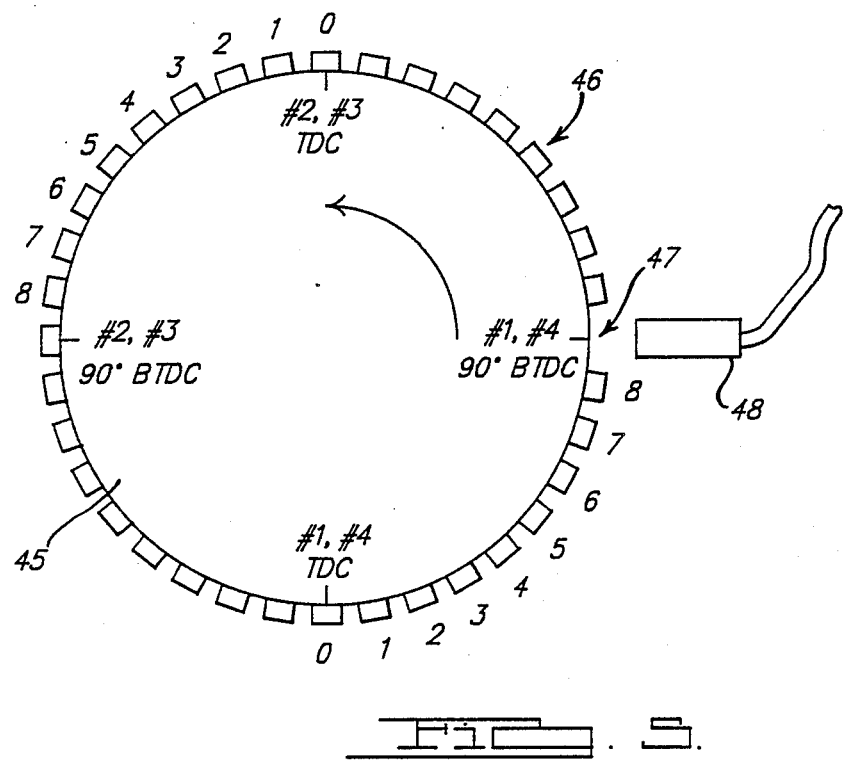
FIG. 5 is a plan view of a timing wheel and position sensor employed in a preferred embodiment of the present invention.

An appreciation of the crankshaft position signals and the crank marker interval will be obtained from an inspection of FIG. 5 which corresponds to a four cylinder engine. A timing wheel 45 is mounted on the engine crankshaft for rotation therewith. A plurality of ferromagnetic teeth 46 project from the body of timing wheel 45 and are preferably spaced at 10° intervals (i.e., the crank marker interval is 10°) except for a missing tooth area 47 which indicates a particular engine rotation location for reference. A variable reluctance sensor 48 is located adjacent the timing wheel for producing signals corresponding to the passage of the ferromagnetic teeth. The sensor 48 is arranged to be opposite missing tooth area 47 when the engine position is at 90° BTDC for engine cylinder #1 in a four cylinder engine. This location of the missing tooth in relation to sensor 48 is chosen in order to minimize timing wheel accelerations and decelerations during sensing of missing tooth area 47 so that a reliable synchronization can be maintained for the absolute position reference of the missing tooth. Engines with six and eight cylinders would require the missing tooth be located at 60° BTDC and 50° BTDC, respectively.

Position sensor 48 produces position signals each 10° of timing wheel rotation as teeth pass across the sensor, except during the passage of a missing tooth the occurrence of which is detected as an indication of absolute position. For purposes of SAW pulse conversion to a spark angle, teeth prior to each top dead center firing position are counted down as shown. Thus, the tooth corresponding to cylinder #1 top dead center is numbered zero with teeth which pass sensor 48 prior to tooth zero having corresponding numbers. Likewise, teeth counting down to top dead center for cylinder #2 are likewise numbered. The crank marker interval as shown in FIG. 5 is 10°. A spark advance of 15° BTDC, for example, would occur between crank marker 1 and crank marker 2.

Variable reluctance sensor 48 can be comprised of a magnetic transducer with a pole piece which is wrapped with fine wire. When exposed to a change in flux, a voltage is induced across the wires. When the timing wheel rotates, the passing ferromagnetic teeth 46 cause changes in reluctance across sensor 48, thus producing a quasi-sine wave output of sensor 48. The sine waves can be interpreted as position signals in which alternate zero crossings indicate the center of each tooth 46. The non-occurrence of an expected zero crossing indicates the presence of the missing tooth area 47.

Returning to the transfer function of FIG. 3, a top dead center offset value is selected as 1536 microseconds (i.e., ZTDC=1536). A clock period of four microseconds is employed in the pulse accumulator, corresponding to a clock frequency of 250 KHz. The crank marker interval is 10° and a desired resolution within the 10° intervals is chosen as 64 descrete steps, i.e., x=6. The formula for determining SAW pulse width in the present example is thus:

$$SAW = 1536 - ST * 4 * 2^6/10$$

The formula simplifies to the following:

$$SAW = 1536 - ST * 25.6$$

Each 10° difference in spark advance results in a 256 microsecond difference in SAW pulse width. Thus, each four microsecond count in the accumulator of the SAW pulse width is equivalent to 5/32° of crankshaft angular resolution.

Conversion of SAW pulse width into a spark advance angle is achieved by manipulating the accumulator value to separate the whole number of crank markers from the fractional portion between a pair of markers. This decoding is preferably performed according to the method illustrated in FIG. 6. 16 bits (i.e., two 8-bit bytes) of SAW data are read from the pulse width accumulator as shown in FIG. 6a. Byte 1 contains the eight low order bits designated B0 to B7. Byte 2 contains a bit B8 which is the highest order bit within the valid range of SAW pulse widths. Thus, the remainder of byte 2 are zero bits. If all other bits in byte 2 are not zero, the pulse accumulator value is invalid and the default spark advance of 10° BTDC will be invoked.

As shown in FIG. 6b, the SAW data is shifted left by a predetermined number of places such that the SAW value is divided by $2^x$ and multiplied by the time value of SAW pulse width corresponding to one crank marker interval. Continuing with the same example, the SAW data is shifted left two bits corresponding to division by $2^6$ or 64 and multiplication by 256 or $2^8$. The value of byte 2 in FIG. 6b corresponds to the whole number of crankshaft markers occurring between the beginning of the valid spark advance range and the commanded spark event. The value of byte 1 in FIG. 6b corresponds to the fractional portion between crank markers at which the spark event is to occur.

In FIG. 6c, the crank marker in byte 2 is subtracted from the binary value of the crank marker last to pass prior to the first valid spark advance value. Thus, since in the present example, spark advance is limited to a value between 10° ATDC and 57.5 BTDC, the last crank marker to pass prior to a valid spark angle is marker #6. Subtracting byte 2 consisting of bits B6 to B8 from the digital value equivalent to marker #6, results in a binary number having bits M1 to M3 which provides the number of the crank marker to pass the position sensor before the spark event is initiated.

In operation, once a SAW pulse has been decoded, the ignition module monitors crankshaft position waiting for the occurrence of a position signal indicating the marker corresponding to the value of bits M1 to M3. Once this crank marker has passed, the fractional portion of an additional interval until the next expected crank marker equivalent to the value of byte 1 in FIG. 6b is counted out. Once the fractional portion has expired, the spark event is initiated.

According to the preferred embodiment, if a single invalid SAW pulse is decoded, the most recent valid SAW value will be used. If invalid SAW pulses continue to be accumulated, the ignition module will assume the programmed default value of 10° BTDC. Once a valid SAW pulse is decoded, it is normally applied to the next occurring spark interval.

The foregoing method for converting the SAW pulse width to a final spark angle command involves direct binary manipulation of the contents of the accumulation register value. This method is quick, minimizes conversion errors, and is particularly useful with high data rate position sensors. Alternatively, the conversion could be performed algebraically by a reverse application of the calculation done by the master controller to encode the pulse.

In addition to the valid range of spark advance pulse width information, additional pulse widths can be associated with other communication codes (i.e., information or messages) for communication between the master controller and the ignition module, as shown in FIG. 3. For example, clock rate errors could be handled by providing a calibration pulse of a predetermined length. Any difference between the measured calibration pulse and its expected length could be used by the ignition module to ratiometrically correct subsequently measured pulse widths. By way of another example, a particular value of pulse width can be associated with a command to implement an alternate spark strategy such as repetitive sparking. Repetitive sparking is disclosed in copending U.S. application Ser. No. 325,817, filed Mar. 20, 1989.

Such other discrete communication codes should likewise include a sufficient guard band to ensure correct communication of the information.

The foregoing method and apparatus of communicating information between a master controller and a slave controller via pulse width modulation through a pulse width accumulator circuit has enhanced the noise immunity of the distributed processing system. In particular, the spark advance pulse width, which is a linearly decreasing function of spark advance value, ensures a sufficient amount of time for communication of a spark advance value at all engine speeds with a sufficient guard band before the occurrence of a succeeding read period. In addition, an efficient method of manipulating the accumulated pulse width has been provided for determining the time of occurrence of the desired ignition spark.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for communicating spark advance value information between electronic engine control modules comprising the steps of:
   calculating said spark advance value in a first module;
   determining a width of a pulse width modulated pulse corresponding to said calculated spark advance value such that said width decreases when said spark advance value increases;
   monitoring rotational position of an engine;
   detecting the occurrence of a communication period with said engine position being within a first predetermined range of rotational positions;
   transmitting said pulse width modulated pulse from said first module to a second module during said communication period;
   integrating said pulse in an accumulator in said second module during said communication period;
   detecting the occurrence of a read period with said engine position being within a second predetermined range of rotational positions;
   reading said integrated pulse from said accumulator during said read period; and
   clearing said accumulator prior to a succeeding communication period;
   wherein said width is determined by the formula;

$$SAW = ZTDC - (ST * T * 2^x/CMI)$$

where SAW is said pulse width;

ZTDC is the pulse width offset corresponding to 0° spark advance;
   ST is the value in degrees of spark advance, and is negative for values after top dead center;
   T is the clock period at which said pulse is accumulated;
   CMI is the number of degrees of engine rotation between position signals for monitoring said engine position; and
   $2^x$ is the number of steps between said position signals for a desired spark advance resolution.

2. The method of claim 1 wherein said read period begins at about 10 degrees after top dead center.

3. Apparatus comprising:
   an electronic engine control for monitoring conditions in a combustion engine and for supervising operation of said combustion engine in response to said monitored conditions, said electronic engine control including means for determining a spark advance value and means for generating a pulse having a pulse width dependent on said spark advance value;
   a communication line coupled to said electronic engine control to receive said pulse therefrom;
   an ignition module for implementing ignition spark control of said engine in accordance with information received from said electronic engine control, said ignition module including a pulse accumulator coupled to said communication line to integrate said pulse;
   position sensor means coupled to said electronic engine control and to said ignition module for providing position signals indicating the angular position of said engine, said electronic engine control and said ignition module being responsive to said position signals to establish a communication period corresponding to a first range of angular positions in which transmission of said pulse occurs and being responsive to said position signals to establish a read period corresponding to a second range of angular positions in which an integrated pulse is read from said accumulator and said accumulator is cleared;
   said ignition module including a central processing unit operating at a clock period T; and
   said electronic engine control further including means for calculating said pulse width according to the formula:

$$SAW = ZTDC - (ST * T * 2^x/CMI)$$

where
   SAW is the calculated pulse width
   ZTDC is the pulse width offset corresponding to 0° spark advance;
   ST is the value in degrees of spark advance, and is negative for values after top dead center;
   T is said clock period;
   CMI is the number of degrees of engine rotation between position signals; and
   $2^x$ is the number of steps between said position signals for a desired spark advance resolution.

4. The apparatus of claim 3 wherein said ignition module further includes decoding means for separating said integrated pulse into a first portion corresponding to the last position signal to be detected prior to the occurrence of the spark advance value and a second portion corresponding to the fractional portion of the time until the next position signal at which the spark advance value occurs.

5. The apparatus of claim 3 wherein said electronic engine control further includes means for generating a pulse having a pulse width corresponding to predetermined communication codes and wherein said ignition module further includes means for identifying said pulse widths corresponding to said communication codes.

* * * * *